(12) United States Patent
Do et al.

(10) Patent No.: US 10,079,389 B2
(45) Date of Patent: Sep. 18, 2018

(54) SILICON-GRAPHENE NANOCOMPOSITES FOR ELECTROCHEMICAL APPLICATIONS

(71) Applicant: XG Science, Inc., Lansing, MI (US)

(72) Inventors: Inhwan Do, East Lansing, MI (US); Hong Wang, Troy, MI (US); Harshal Manubhai Bambhania, East Lansing, MI (US); Liya Wang, Ann Arbor, MI (US)

(73) Assignee: XG SCIENCES, INC., Lansing, MI (US)

( * ) Notice: Subject to any disclaimer, the term of this patent is extended or adjusted under 35 U.S.C. 154(b) by 8 days.

(21) Appl. No.: 14/079,057

(22) Filed: Nov. 13, 2013

(65) Prior Publication Data

US 2014/0255785 A1    Sep. 11, 2014

Related U.S. Application Data

(63) Continuation-in-part of application No. 13/474,860, filed on May 18, 2012.

(51) Int. Cl.
*H01M 4/38* (2006.01)
*H01M 4/60* (2006.01)
(Continued)

(52) U.S. Cl.
CPC .............. *H01M 4/625* (2013.01); *C09D 1/00* (2013.01); *C09D 7/61* (2018.01); *H01B 1/04* (2013.01);
(Continued)

(58) Field of Classification Search
CPC ... H01B 1/02; H01B 1/04; H01B 1/24; B82Y 30/00; B82Y 40/00; H01M 4/386; H01M 4/625; H01M 4/134; H01M 4/366
(Continued)

(56) References Cited

U.S. PATENT DOCUMENTS

| 7,071,258 B1 | 7/2006 | Jang et al. |
| 7,566,410 B2 | 7/2009 | Song et al. |

(Continued)

FOREIGN PATENT DOCUMENTS

| WO | WO-2006071076 A1 | 7/2006 |
| WO | WO-2010102655 A2 | 9/2010 |

(Continued)

OTHER PUBLICATIONS

Lee ("Highly Photoactive, Low Bandgap TiO2 Nanoparticles Wrapped by Graphene." Adv Mater, 24, pp. 1084-1088, online Jan. 24, 2012).*
Yang ("Fabrication of graphene-encapsulated oxide nanoparticles: towards high-performance anode materials for lithium storage." Angew Chem Int Ed Engl.;49(45):8408-11, pub Nov. 2010).*

(Continued)

*Primary Examiner* — Tri V Nguyen
(74) *Attorney, Agent, or Firm* — Avery N. Goldstein; Blue Filament Law, PLLC

(57) ABSTRACT

A nanographitic composite for use as an anode in a lithium ion battery includes nanoscale particles of an electroactive material; and a plurality of graphene nanoplatelets having a thickness of 0.34 nm to 5 nm and lateral dimensions of less than 900 nm, wherein the electroactive particle has an average particle size that is larger than the average lateral dimension of the graphene nanoplatelets, and the graphene nanoplatelets coat at least a portion of the nanoscale particles to form a porous nanographitic layer made up of overlapping graphene nanoplatelets.

35 Claims, 15 Drawing Sheets

(51) Int. Cl.

| | | |
|---|---|---|
| *H01B 1/02* | (2006.01) | |
| *H01B 1/04* | (2006.01) | |
| *H01M 4/62* | (2006.01) | |
| *H01M 4/134* | (2010.01) | |
| *C09D 1/00* | (2006.01) | |
| *H01M 4/36* | (2006.01) | |
| *C09D 7/61* | (2018.01) | |
| *B82Y 30/00* | (2011.01) | |
| *B82Y 40/00* | (2011.01) | |
| *H01G 11/36* | (2013.01) | |
| *H01G 11/50* | (2013.01) | |

(52) U.S. Cl.
CPC ........... *H01M 4/134* (2013.01); *H01M 4/366* (2013.01); *H01M 4/386* (2013.01); *B82Y 30/00* (2013.01); *B82Y 40/00* (2013.01); *H01G 11/36* (2013.01); *H01G 11/50* (2013.01)

(58) Field of Classification Search
USPC .......... 252/500–519.1, 71; 429/218.1, 231.8, 429/232
See application file for complete search history.

(56) References Cited

U.S. PATENT DOCUMENTS

| | | | |
|---|---|---|---|
| 7,623,340 | B1 | 11/2009 | Song et al. |
| 7,745,047 | B2 | 6/2010 | Zhamu et al. |
| 7,993,780 | B2 | 8/2011 | Jang et al. |
| 8,119,288 | B2 | 2/2012 | Zhamu et al. |
| 8,241,793 | B2 | 8/2012 | Zhamu et al. |
| 8,611,070 | B2 * | 12/2013 | Ivanovici ............... B82Y 30/00 361/502 |
| 2004/0150312 | A1 | 8/2004 | McElrath et al. |
| 2005/0106098 | A1 | 5/2005 | Tsang |
| 2006/0035149 | A1 | 2/2006 | Nanba et al. |
| 2009/0020734 | A1 | 1/2009 | Jang |
| 2009/0117467 | A1 | 5/2009 | Zhamu |
| 2009/0169996 | A1 | 7/2009 | Zhamu et al. |
| 2009/0176159 | A1 | 7/2009 | Zhamu et al. |
| 2010/0283005 | A1 | 11/2010 | Pickett et al. |
| 2010/0291438 | A1 | 11/2010 | Ahn et al. |
| 2011/0073834 | A1 | 3/2011 | Hannon et al. |
| 2011/0129675 | A1 | 6/2011 | Choi et al. |
| 2011/0311869 | A1 | 12/2011 | Oh et al. |
| 2012/0019342 | A1 | 1/2012 | Gabay et al. |
| 2012/0021294 | A1 | 1/2012 | Zhamu et al. |
| 2012/0064409 | A1 | 3/2012 | Zhamu et al. |
| 2012/0321953 | A1 * | 12/2012 | Chen ...................... B82Y 30/00 429/219 |
| 2012/0328953 | A1 | 12/2012 | Hirohashi et al. |
| 2013/0052537 | A1 | 2/2013 | Takeuchi et al. |
| 2013/0130020 | A1 | 5/2013 | Kim et al. |
| 2013/0260152 | A1 | 10/2013 | Murray et al. |
| 2013/0295000 | A1 * | 11/2013 | Dickinson ........... C01B 31/0446 423/448 |
| 2013/0309495 | A1 | 11/2013 | Do et al. |

FOREIGN PATENT DOCUMENTS

| | | |
|---|---|---|
| WO | WO-2013056074 A1 | 4/2013 |
| WO | WO-2013114095 A1 | 8/2013 |

OTHER PUBLICATIONS

Lee ("Highly Photoactive, Low Bandgap $TiO_2$ Nanoparticles Wrapped by Graphene." With supporting information. Adv. Mater. 2012, 24, 1084-1088 (Year: 2012).*
Xilin Chen ("Conductive Rigid Skeleton Supported Silicon as High-Performance Li-Ion Battery Anodes." with supporting information Nano Lett. 2012, 12, 4124-4130 (Year: 2012).*
XG Sciences, New Battery Anode with Four Times the Capacity of Conventional Materials, Press Release by XG Sciences on Apr. 11, 2013, 1 page, Retrieved from (http://xgsciences.com/releases/new-battery-anode/).
Privette et al., "High Specific Energy Silicon-Graphene Anode Development at XG Sciences," NASA Aerospace Battery Workshop Oral Presentation delivered Nov. 8, 2012, in Huntsville, Alabama, 24 pages, available online on or after Dec. 19, 2012.
Privette et al., "Low-cost, high capacity Si/xGnP® graphene Li-ion batter anode material," XG Sciences Presentation Poster, 1 page, Feb. 6, 2012.
Privette, R., "Nanomaterials that improve energy devices, coatings, films, and composites," XG Sciences Presentation sent to EIC Labs on Oct. 29, 2012, sent to K2 Battery on Oct. 18, 2012, sent to Rayovac on Oct. 2, 2012, 28 pages.
Privette, R., "Nanomaterials that improve energy devices, coatings, films, and composites," XG Sciences Presentation sent to BASF on Aug. 8, 2012, 26 pages.
International Search Report and Written Opinion issued by the U.S. Patent and Trademark Office as International Searching Authority for International Application No. PCT/US2014/065459 dated Mar. 3, 2015 (11 pages).
Owano, "XGS Presents New Silicon-Graphen Anode Materials for Lithium-Ion Batteries," 11 pages, retrieved online at [URL:<<http://phys.org/news/2013-04-xgs-silicon-graphene-anode-materials-lithium-ion.html>>] on May 28, 2015 (Apr. 13, 2013).
Chen et al., "Conductive Rigid Skeleton Supported Silicon as High-Performance Li-Ion Battery Anodes", Nano Letters, Jul. 16, 2012, vol. 12, No. 8, pp. 4124-4130.
Chen et al., "In Situ Generation of Few-Layer Graphene Coatings on $SnO_2$—SiC Core-Shell Nanoparticles for High-Performance Lithium-Ion Storage", Advanced Energy Materials, Nov. 16, 2011, vol. 2, No. 1, pp. 95-102.
Datta et al., "Silicon and carbon based composite anodes for lithium ion batteries", Journal of Power Sources, Jul. 14, 2006, vol. 158, No. 1, pp. 557-563.
Dong et al., "Structural and electrochemical characterization of Fe—Si/C composite anodes for Li-ion batteries synthesized by mechanical alloying", Electrochimica Acta, Aug. 17, 2004, vol. 49, No. 28, pp. 5217-5222.
European Search Report dated May 16, 2017 in the European patent application No. 14861458.9, 13 pages.
Wang et al., "Lithium Insertion in Carbon-Silicon Composite Materials Produced by Mechanical Milling", Journal of The Electrochemical Society, Aug. 1, 1998, vol. 145, No. 8, pp. 2751-2758.
Yoon et al., "Nano Si-coated graphite composite anode synthesized by semi-mass production ball milling for lithium secondary batteries", Surface & Coatings Technology, Jul. 25, 2011, vol. 206, No. 2, pp. 553-558.
Erdogan, E. et al., "Engineering carbon chains from mechanically stretched graphene-based materials", Physical Review B, Jan. 4, 2011, pp. 041401-1-041401-4, vol. 83, Issue 4, © 2011 The American Physical Society; DOI: 10.1103/PhysRevB.83.041401.

* cited by examiner

300

310

SILICON-GRAPHENE NANOCOMPOSITES FOR ELECTROCHEMICAL APPLICATIONS

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND OF THE INVENTION

This invention relates to graphene nanoplatelet composites with electroactive materials, and electroactive materials coated with graphene nanoplatelets. The graphene nanocomposites are useful as battery materials.

Lithium-ion batteries are being pursued for a variety of applications including electric or hybrid electric vehicles (EV & HEV), consumer electronics, grid energy storage systems and distributed power generation units. The success of LIB in such markets strongly depends on the cost, energy density, power capability, cycle life, and safety of the battery cells, which are largely dominated by the electrode materials used. While LIB technologies have advanced significantly since their first commercialization in the early 90's, they are not keeping pace with the ever increasing demand for batteries with higher energy storage capacities. For example, DOE EV Everywhere program defines an EV cell target of 400 Wh/kg with 1000 cycles, at cost of ownership comparable to conventional ICE vehicles. This target cannot be met with current LIB chemistries, especially with graphite as the anode. Because of graphite's low capacity, a cell with a carbon-based anode can reach at most 200-250 Wh/kg, depending on the type of cathode. Therefore, there is a great need to develop advanced anodes for future generation LIB.

Silicon (Si) is considered as the most promising anode material due to its high capacity and proper working voltage. Theoretically, Si can provide up to 4200 mAh/g of Lithium (Li) storage capacity. It can be lithiated in the potential range of 0.0~0.4 V, which provides the capability to make a high energy density device when paired with an appropriate cathode. Nevertheless, replacing traditional graphite anode materials with Si has proven to be very challenging. Two major barriers have hindered the development of Si-based anodes for commercial applications, especially for use in EV batteries:

Poor cycle life. Si tends to pulverize during cycling as a result of substantial volume change (up to 400%) during charging/discharging of the batteries, which in turn leads to the loss of electrical contact or even disintegration of both Si particles and the electrode coating.

High synthesis cost. Most of the processes used for the synthesis of Si-based anodes utilize expensive chemical precursors, exotic synthesis methods, or capital-intensive processes. Furthermore, they are usually not suitable for high-volume production. As a result, none of these processes has been successfully commercialized.

In order to solve the cycling stability problems, researchers have taken various approaches including (a) using nano particles, nanotubes, nano-spheres, and nanowires, (b) applying carbon coating by various methods, or (c) designing porous Si structures. While the capacity, rate capability, and cycling stability have been improved to a certain extent with these processes, the materials usually have relatively low first cycle reversibility and in general still cannot meet the life requirements for most commercial applications.

Silicon particles coated by carbon layers via chemical vapor deposition and carbonization process using carbon precursors such a pitch, glucose, sugar, polyacrylonitrile, polyvinyl alcohol etc. In such coating processes, a carbon thin film 1010 on Si 1020 surface forms a continuous phase, as illustrated in FIG. 14A, which results in retarding electrolyte penetration and thus $1^{st}$ cycle efficiency is generally low.

Other approaches involved the coating of silicon particles 1040 with graphene materials 1030 such as graphenes reduced from graphite oxide, exfoliated graphene, as illustrated in FIG. 14B. In this case, the graphene size is larger than the Si size and one graphene particle makes contact with more than one Si particles. This results in a somewhat rigid framework that cannot easily accommodate the significant volume change during lithium cycling.

And, the high cost may still be a major obstacle preventing the use of Si as a commercial anode even if the performance is improved. Therefore, a high-performance and low-cost Si-based anode remains a lofty goal of the battery industry.

SUMMARY

In one aspect, a nanographitic composite for use as an anode in a lithium ion battery includes particles of an electroactive material; and a coating layer comprising a plurality of graphene nanoplatelets having a thickness of 0.34 nm to 50 nm and a lateral dimension of less than 900 nm, wherein the electroactive particles have a lateral dimension that is larger than the lateral dimension of the graphene nanoplatelets, and the graphene nanoplatelets coat at least a portion of the nanoscale particles to form a layer made up of overlapping graphene nanoplatelets.

In one or more embodiments, the graphene nanoplatelets-coated nanoscale particles form agglomerates.

In any of the preceding embodiments, the lateral dimension of the graphene nanoplatelets is less than 50% of the lateral dimension of the electroactive particle, or the lateral dimension of the graphene nanoplatelets is less than 25% of the lateral dimension of the electroactive particle, or the lateral dimension of the graphene nanoplatelets is less than 10% of the lateral dimension of the electroactive particle.

In any of the preceding embodiments, more than 50% of the surface area of the electroactive particle is coated by the nanographene coating layer, or more than 70% of the surface area of the electroactive particle is coated by the nanographene coating layer, or more than 80% of the surface area of the electroactive particle is coated by the nanographene coating layer, or more than 90% of the surface area of the electroactive particle is coated by the nanographene coating layer, or more than 95% of the surface area of the electroactive particle is coated by the nanographene coating layer.

In any of the preceding embodiments, more than 50% of the electroactive particles have a lateral dimension that is larger than the lateral dimension of the nanographene platelets coating the particles, or more than 60% of the electroactive particles have a lateral dimension that is larger than the lateral dimension of the nanographene platelets coating the particles, or In more than 70% of the electroactive particles have a lateral dimension that is larger than the lateral dimension of the nanographene platelets coating the particles, more than 80% of the electroactive particles have a lateral dimension that is larger than the lateral dimension of the nanographene platelets coating the particles, or more than 90% of the electroactive particles have a lateral dimension that is larger than the lateral dimension of the nanographene platelets coating the particles, or more than 95% of the electroactive particles have a lateral dimension that is larger than the lateral dimension of the nanographene platelets coating the particles.

In any of the preceding embodiments, the graphene nanoplatelets have a lateral dimension of less than 500 nm, or the graphene nanoplatelets have a lateral dimension of 30 nm to 200 nm.

In any of the preceding embodiments, the layer include multiple layers of graphene nanoplatelets.

In any of the preceding embodiments, the electroactive material one or more material selected from the group consisting of silicon, tin, iron, magnesium, aluminum, lead, gold, silver, titanium, platinum, palladium, ruthenium, copper, nickel, rhodium and nickel and combinations thereof.

In any of the preceding embodiments, electroactive material includes silicon.

In any of the preceding embodiments, the silicon is present in a range from 5 wt % to 90 wt % of the composite, or the silicon is present in a range from 40 wt % to 70 wt % of the composite.

In any of the preceding embodiments, the composite further includes a conductive carbon additive.

In any of the preceding embodiments, the conductive carbon additive is selected from the group consisting of carbon black, acetylene black, carbon nanotube, carbon fiber, carbon nanohorn, carbon nanocoil and combinations thereof.

In any of the preceding embodiments, the composite has a tap density of greater than 0.50 g/cm$^3$, or the composite has a tap density of greater than 0.8 g/cm$^3$.

In any of the preceding embodiments, the electroactive particle is present in a range from 5 wt % to 90 wt % of the composite.

In any of the preceding embodiments, the surface area is in the range of 50 to 200 m$^2$/g.

In another aspect, an electrode for use as an anode in a lithium ion battery includes (a) the nanographitic composite according to any preceding embodiment; and (b) a binder.

In any of the preceding embodiments, the electrode further includes a conductive additive.

In any of the preceding embodiments, the conductive additive comprises a graphene.

In any of the preceding embodiments, the conductive additive is 2 to 20 wt % of the total electrode weight.

In any of the preceding embodiments, the binder is 3 to 20 wt % of the total electrode weight.

In another aspect, a lithium ion battery is provided having an anode according to any preceding claim. a cathode, a separator spacing apart the anode and the cathode; and an electrolyte in contact with the anode and the cathode.

In another aspect a method of making a nanocomposite suitable for use in a lithium ion battery includes introducing an electroactive particle powder into a high energy dry mill, wherein the particles are of a micron-scale dimension; introducing a graphite particle powder into the high energy dry mill, wherein the particles are of a micron-scale dimension; and milling the electroactive particle powder and the graphite particle powder, to exfoliate the graphite and reduce the particle size of the electroactive particle to less than 3 um and reduce the particle size of the graphite particle to less than 900 nm; wherein the exfoliated size-reduced graphite coats the surface of the sized-reduced electroactive particle, and wherein the resultant nanocomposite has a bulk density of greater than 0.50 g/cm$^3$.

An electrode material comprising nanographene platelets and an electroactive material wherein the nanographene platelets are covalently bonded to the electro active material by pi bonds or partial pi bonds.

In another aspect a nanocomposite is provided that is prepared by the reaction of nanographitic platelets having a thickness of 0.34 nm to 50 nm and lateral dimensions of less than 900 nm, with electroactive particles, wherein the electroactive particle has an lateral dimension that is larger than a lateral dimension of the nanographitic platelets.

In another aspect, a nanographitic composite for use as an anode in a lithium ion battery includes a plurality of composite particles having an electroactive particle; and a coating layer comprising an inner layer of graphene nanoplatelets that are tightly bound to the electroactive particle and an outer layer of graphene nanoplatelets that interact loosely with the inner layer of graphene nanoplatelets, wherein the nanographitic platelets covers at least a portion of the nanoscale particle to form a nanographitic layer.

In any of the preceding embodiments, the inner layer includes a mixture of carbon and silicon.

In any of the preceding embodiments, the inner layer has a thickness in the range of 5-25 nm.

In any of the preceding embodiments, the inner layer is integral with the electroactive particle.

In any of the preceding embodiments, the inner layer is crystalline, or the inner layer is disordered or amorphous.

In any of the preceding embodiments, the electroactive particle includes silicon and the inner layer comprises an SiC intermetallic.

In any of the preceding embodiments, the inner layer is covalently bonded to the electroactive particle.

In any of the preceding embodiments, the covalent bond is a pi-bond or a partial pi-bond.

In any of the preceding embodiments, the silicon and carbon content of the inner layer varies across its thickness.

In any of the preceding embodiments, the graphene nanoplatelets-coated nanoscale particles form agglomerates.

In any of the preceding embodiments, the graphene nanoplatelets have a thickness of 0.34 nm to 50 nm and lateral dimensions of less than 900 nm.

In any of the preceding embodiments, the coating layer includes multiple layers of graphene nanoplatelets.

In any of the preceding embodiments, the electroactive particle include one or more material selected from the group consisting of silicon, tin, iron, magnesium, aluminum, lead, gold, silver, titanium, platinum, palladium, ruthenium, copper, nickel, rhodium and nickel and combinations thereof.

In any of the preceding embodiments, electroactive particle comprises silicon.

In any of the preceding embodiments, the silicon is present in a range from 10 wt % to 90 wt % of the composite.

In any of the preceding embodiments, the composite further includes a conductive carbon additive.

In any of the preceding embodiments, the conductive carbon additive is selected from the group consisting of carbon black, acetylene black, carbon nanotube, carbon fiber, carbon nanohorn, carbon nanocoil and combinations thereof.

In any of the preceding embodiments, the composite has a tap density of greater than 0.50 g/cm$^3$, or the composite has a tap density of greater than 0.8 g/cm$^3$.

In any of the preceding embodiments, the silicon is present in a range from 10 wt % to 90 wt % of the composite.

In another aspect, an electrode for use as an anode in a lithium ion battery includes (a) the nanographitic composite according to any preceding embodiment; and (b) a binder.

In any of the preceding embodiments, the electrode further includes a conductive additive.

In any of the preceding embodiments, the conductive additive comprises a graphene.

In any of the preceding embodiments, the conductive additive is 2 to 20 wt % of the total electrode weight.

In any of the preceding embodiments, the binder is 3 to 20 wt % of the total electrode weight.

2-dimensional and flexible graphene nanoplatelets are introduced into the Si anode structure to accommodate the volume change of Si particles and maintain the integrity of the electrode during cycling. The face contact between graphene nanoplatelets and Si particles is more effective in maintaining an electric pathway than the zero dimensional carbon particle or one-dimensional carbon nanotube additives. Graphene nanoplatelets of suitable size relative to the electroactive particles are selected to optimize performance in a lithium ion battery.

BRIEF DESCRIPTION OF THE DRAWING

The invention is described with reference to the following figures, which are presented for the purpose of illustration only and are not intended to be limiting.

In the Drawings.

DETAILED DESCRIPTION

Figure 1A:
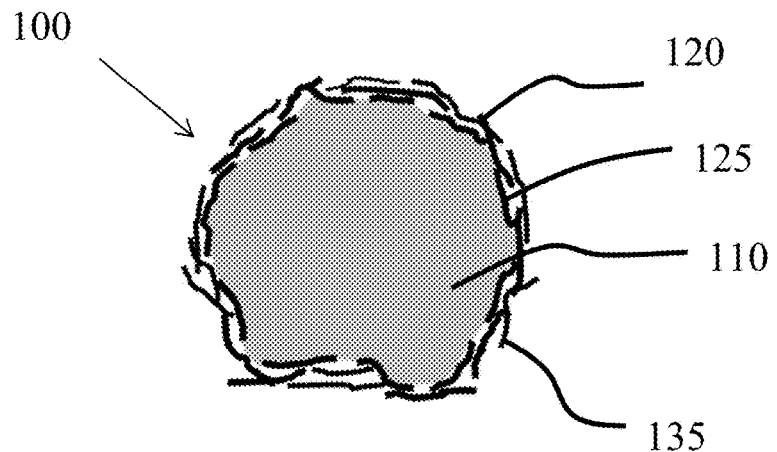
FIGS. 1A and 1B are schematic illustrations of a nanographitic composite according to one or more embodiments.

A nanographitic composite for use as a battery material in a lithium ion battery is described. The composite material includes nanoscale and microscale particles of an electroactive material, such as silicon, that are directly coated with nanographitic platelets or graphene nanoplatelets. By directly coated it is meant that the graphene forms a direct contact with the electroactive particle. The contact is sufficiently direct to allow the formation of a strong, robust interaction between the graphene nanoplatelets and the electroactive materials. Similarly, there is no intermediary material disposed between the graphene and the electroactive particle.

The graphene nanoplatelets are of a relatively small dimension, that is, the graphene nanoplatelets are nanoscale and are not of the lengths typically associated with graphitic platelets or flakes (which are greater than 1 μm and typically greater than 10 μm). The electroactive particle has an average particle size that is larger than or of a comparable size to the average lateral dimension of the graphene nanoplatelets. The size requirements are an unexpected result as the art teaches further reduction in particle size of the electro active material is desirable and we have discovered the relatively larger electro active material with smaller nanographic platelets has improved capacity and cycle life. In one or more embodiments, a longest lateral dimension of the graphene nanoplatelets is less than a longest lateral dimension of the electroactive particle. In one or more embodiments, a longest lateral dimension of the graphene nanoplatelets is less than 50% of a longest lateral dimension of the electroactive particle. In one or more embodiments, a longest lateral dimension of the graphene nanoplatelets is less than 25% of a longest lateral dimension of the electroactive particle. In one or more embodiments, a longest lateral dimension of the graphene nanoplatelets is less than 10% of a longest lateral dimension of the electroactive particle.

The electroactive particle is substantially completely coated by the nanographene coating. By substantially completely coated, it is meant that at more than 50%, or at least 70%, or at least 80% to at least 90% or at least 95% of the surface area of the electroactive particle is coated with the graphene nanoplatelet layer. The remaining area may be uncoated or it may interact with graphene sheets or flakes of larger (longer) dimensions. The smaller graphene nanoplatelets are able to surround and attach to the electroactive particle to form a nanographitic layer made up of overlapping graphene nanoplatelets. Two-dimensional and flexible graphene nanoplatelets wrap around electroactive particles, accommodate the dimensional change of electroactive particles during electrochemical cycling, and help maintain electric contact between particles and/or other components in the electrode coating.

In one or more embodiments, the nanographene platelets form a strong association with the surface of the electroactive particle. The graphene nanoplatelets can be physically attached or chemically bonded to the surface of the electrochemical particle. In certain embodiments, the nanocomposite includes covalent bonding of the graphene carbon to the surface of the electroactive material through pi-bonds or partial pi-bonds. In other embodiments, the carbon from the graphene can diffuse into the electroactive particle to form a layer of mixed carbon and electroactive material. The region can be amorphous, disordered, crystalline, or can include a compound formed between the electroactive material and carbon.

In one or more embodiments, the graphene nanoplatelets can stack or overlap in the coating and can form multi-layer discontinuous or continuous coatings. In one or more embodiments, the graphene nanoplatelets are arranged around the electroactive particle to form an inner graphene layer that is tightly bound to the electroactive core, for example, by covalent bonding and/or formation of interdiffusion regions that contain both carbon and electroactive material, and a loosely associated graphene layer assembled, for example, by van der Waals attraction between graphene nanoplatelets. The graphene nanoplatelet layers can be made up of stretched or tangled graphene layers.

Because the graphene nanoplatelets are relatively short and assemble by stacking on one another, the layer is permeable to electrolyte. The coating provides electrolyte access to the electroactive particle in the core, while robustly adhering to the electroactive particle. Advantageously, the graphene nanoplatelet layer is capable of accommodating the expansion and contraction of the electroactive particle during electrochemical cycling without loss of electrical conductively or mechanical degradation of the composite.

FIG. 1A is a schematic illustration of a nanographitic composite in which the electroactive particle is silicon, e.g., a silicon-nanographitic or nSiG composite, according to one or more embodiments. The nSiG composite 100 is in form of Si particle 110 covered by multilayers of many graphene nanoplatelets 120. As can be seen, the Si particle is much larger than the lateral dimensions of the graphene nanoplatelets. In one or more embodiments, a longest lateral dimension of the graphene nanoplatelets is less than a longest lateral dimension of the silicon particle. In one or more embodiments, a longest lateral dimension of the graphene nanoplatelets is less than 50% of a longest lateral dimension of the silicon particle. In one or more embodiments, a longest lateral dimension of the graphene nanoplatelets is less than 25% of a longest lateral dimension of the silicon particle. In one or more embodiments, a longest lateral dimension of the graphene nanoplatelets is less than 10% of a longest lateral dimension of the silicon particle. A portion of the graphene nanoplatelets, e.g., nanoplatelet 125, forms a strong interaction with the surface of the silicon particle 110. As noted above, this interaction can be, among others, a covalent interaction between the carbon and silicon or it can be interdiffusion or mixing of the silicon and carbon. Other moieties, such as oxygen, may also be involved in the formation of the strong interaction between the two components. A portion of the graphene nanoplatelets, e.g., nanoplatelet 135, forms a looser association or interaction with the surface of the silicon particle 110. Such association can be due, among other reasons, to van der Waals attractive forces between the graphene nanoplatelets.

In one or more embodiments, the silicon is present in a range from 5 wt % to 90 wt % of the composite. In one or more embodiments, the silicon is present in a range from 5 wt % to 20 wt % of the composite. In one or more embodiments, the silicon is present in a range from 5 wt % to 40 wt % of the composite. In one or more embodiments, the silicon is present in a range from 20 wt % to 70 wt % of the composite. In one or more embodiments, the silicon is present in a range from 40 wt % to 70 wt % of the composite. The relative proportions of the Si and graphene can be selected to provide a target energy density or to provide a desired electronic conductivity in the nanocomposite. In embodiments in which the graphene proportion is large, there may be excess graphene that is not directly associated with the electroactive particle in the manner described hereinabove. In this case, the graphene-coated electroactive particles may be embedded in a matrix of graphene. The matrix graphene may be larger in size than the nanographene platelets that coat the electroactive particles. Similarly, in embodiments in which the graphene proportion is low, the coating on the electroactive particles may not completely cover the underlying electroactive particle surface. Nonetheless, it is expected that the graphene nanoplatelet layer covers at least a portion of the electroactive particle surface area.

Figure 1B:
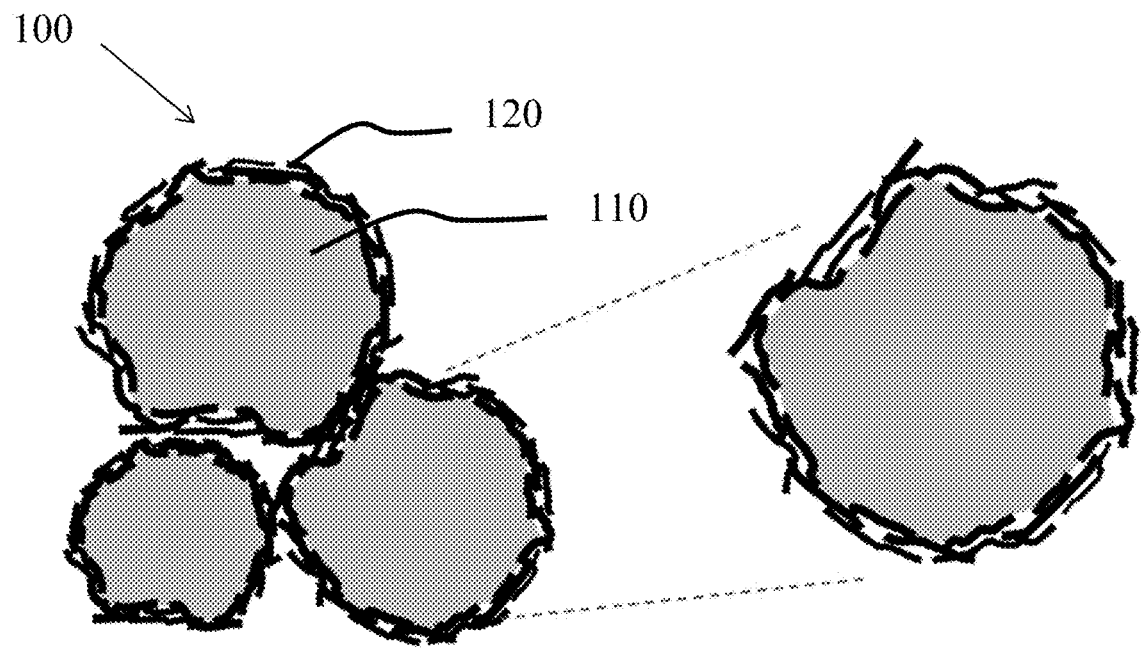

FIG. 1B is a schematic illustration showing a cluster or agglomeration of coated electroactive particles (in which common elements are similarly labeled). Agglomerates can range in size depending on the size of the silicon particles. In one or more embodiments, the agglomerate size is greater than 2 µm; in other embodiments, the agglomerate size is about 2 µm.

In certain embodiments, the electroactive particle (shown here as Si as an example) can range in particle size from 10 nm to 3 µm. Typically, the electroactive particle is about 500 nm to about 3 µm, or about 1-2 µm, with a tail into the smaller particle size. As is discussed below in relation with the methods used to make the nanocomposite, the range of particle size can be quite large. Due, in part, to the large particle size distribution after dry milling as described herein below, a portion of the electroactive particle sizes may be smaller than the graphene nanoplatelets and a portion of the electroactive particles may be larger than the graphene nanoplatelets; however, the predominant number of electroactive particles in the nanocomposite will have the longest lateral dimension of the graphene nanoplatelets less than the longest lateral dimension of the electroactive particle. By predominant as used herein, it is meant that more than 50%, or more than 60% or more than 70% or more than 80% or more than 90%, or more than 95% of the electroactive particles have a longest lateral dimension that is large than the nanographene platelets coating the particles.

The electroactive particle is made using an electrochemically active material (other than carbon) that is capable of taking up or intercalating lithium ions. The electrochemically active material can be metals or metalloids such as silicon (Si), germanium (Ge), tin (Sn), lead (Pb), antimony (Sb), bismuth (Bi), zinc (Zn), aluminum (Al), and cadmium (Cd). The electrochemically active material can be alloys or intermetallic compounds of Si, Ge, Sn, Pb, Sb, Bi, Zn, Al, or Cd, stoichiometric or non-stoichiometric with other elements. The electrochemically active material can be oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd. In one or more embodiments, the electroactive material is one or more metal selected from the group consisting of silicon, tin, iron, magnesium, aluminum, lead, gold, silver, titanium, platinum, palladium, ruthenium, copper, nickel, rhodium and nickel and combinations thereof.

The size of the graphene nanoplatelets can be less than 900 nm. In certain embodiments, the graphene nanoplatelets can be less than 500 nm. In certain embodiments, the nanosized graphene nanoplatelets are in a range of 10 nm to 900 nm or in a range of 10 nm to 700 nm. In other embodiments, the nanosized graphene platelets are in a range of 30 nm-200 nm. In some embodiments, the nanosized graphene platelets have a thickness of 0.34 nm to 50 nm or a thickness of 0.34 nm to 5 nm or a thickness of less than 2 nm. Hence, for example, one single Si particle with 1 μm diameter may be covered by 10~1000 nanosized graphite particles. The graphene nanoplatelets can have a relatively narrow aspect ratio, e.g., greater than graphite. Aspect ratios above 5 and below 500 are preferred and more preferred are aspect ratios above 10 and below 100. Aspect ratio as used herein refers to (length, width)/width. For an exemplary SiG nanocomposite, the surface area of graphene is above 300 $m^2/g$. In certain embodiments, the overall surface area of the graphite nanocomposite is greater than 50 $m^2/g$, or greater than 100 $m^2/g$, or between 50 $m^2/g$ and 200 $m^2/g$. In certain embodiments, the overall surface area of the nSiG nanocomposite is greater than 50 $m^2/g$, or greater than 100 $m^2/g$, or between 50 $m^2/g$ and 200 $m^2/g$.

Graphene has superior electrical and thermal conductivities, excellent mechanical strength, and good flexibility with a thin 2-dimensional morphology. As a bulk material, graphene nanoplatelets, which are a stacking of a few layers of graphene possess many of these desirable properties. In one or more embodiments, graphene nanoplatelets are built into the composite structure to mitigate the expansion and contraction of Si particles. Due to the compact assembly of the graphene nanoplatelets around the core particle, the bulk density of the materials is high as compared to prior art composites made using larger graphene sheets or flakes. In one or more embodiments, the tap density of the nanocomposite is greater than 0.8 $g/cm^3$. Tap density can be measured using techniques that are well-known to those of skill in the art. Exemplary methods for measuring tap density include ASTM D7481-09.

Without being bound by any particular mode of operation, it is hypothesized that the graphene nanoplatelets form strong interactions with the electroactive particle, e.g., silicon, for example, by covalent bonding between the two. In one or more embodiments, the nanographitic platelets are covalently bonded to the electro active material by pi bonds (or partial pi bonds). In one or more embodiments, the graphene forms a diffusion layer with the electroactive particle to create an interlayer region containing both carbon and the electroactive material. The graphene nanoplatelets interact with one another through weaker interactions, such as van der Waals interactions. Thus, the nanocomposites contain an inner carbon-containing layer that strongly interacts with the electroactive particle and an outer layer of graphene that is loosely associated with the underlying graphene layer. As expansion occurs, the graphene layers slide easily over one another, while the inner layer remains firmly interactive with the silicon particle. Given that the graphene layers can glide easily due to weak Van der Waals force, a strong bond on one side and easy glide on the other side can make this material more adaptive to Si volume change. In addition, the surface graphene layers are stacked non-linearly, in an undulating or crimped fashion, that can stretch or extend to accommodate the electroactive particle as it expands. This helps keep the integrity of the composite.

Figure 1C:
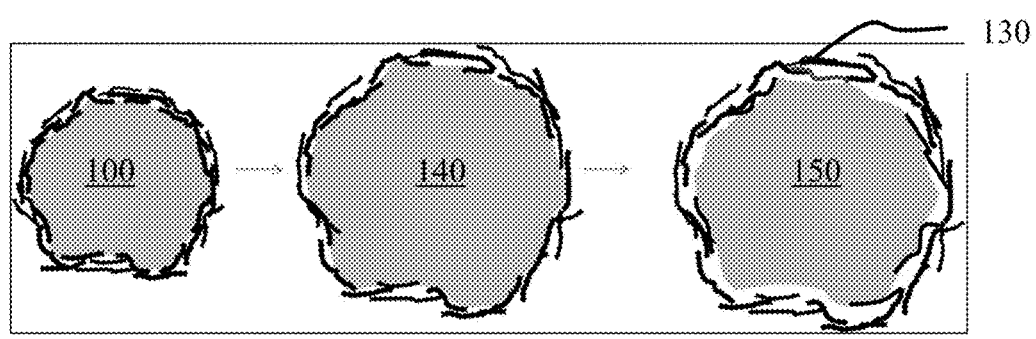
FIG. 1C is schematic illustration of the expansion of a nanographitic composite during electrochemical cycling according to one or more embodiments.

The Si/graphene composite can be integrated into the anode of a lithium ion battery to mitigate the severe expansion and contraction of Si particles during electrochemical cycling. The graphene nanoplatelets provide a large contact area with Si particles and their flexibility helps accommodate the volume change of Si particles during the charging and discharging of the battery. FIG. 1C is a schematic illustration showing the advantageous properties of the nanographitic composite during an expansion event, such as during electrochemical cycling. The nanocomposite 100 includes a coated particle as prepared according to compositing methods, for example, as are described herein below. During lithiation, lithium ions are taken up by the silicon particle, causing it to expand 140. The multilayer of graphene anoplatelets is held in place, at least in part, via the strong interaction of the first graphene nanoplatelets with the surface of the silicon particles and the van der Waals interaction of the multiple layers of graphene nanoplatelets. When the Si phase is expanded by the lithiation process, the graphene coating can be thinned, but the graphene nanoplatelets still keep their connection due to the multilayer structure of the graphene nanoplatelet coating. When Si is contracted in delithiation process, the interaction between the Si surface and graphitic coating layer is robust and can accommodate the size reduction, as shown for nanocomposite 150. The overlapping formation and interparticle attraction provides a support so that the interconnection of graphitic particles 130 does not collapse or break up and the electronic connectivity is sustained. Due to the relatively good connectivity of the coating with the silicon particle and its robustness on expansion and contraction, coulombic efficiency of nSiG nanocomposite remains over 99% after the $2^{nd}$ cycle, which is rare for any Si composited coated by carbon and/or graphene.

In another aspect, the graphitic nanocomposite can include other additives selected to impart additional desirable features to the nanocomposite. Suitable additives include metallic additives, and conductive additives, such as carbon blacks, carbon nanotubes and other graphene additives to improve the electronic connectivity within the composite.

Figure 2:
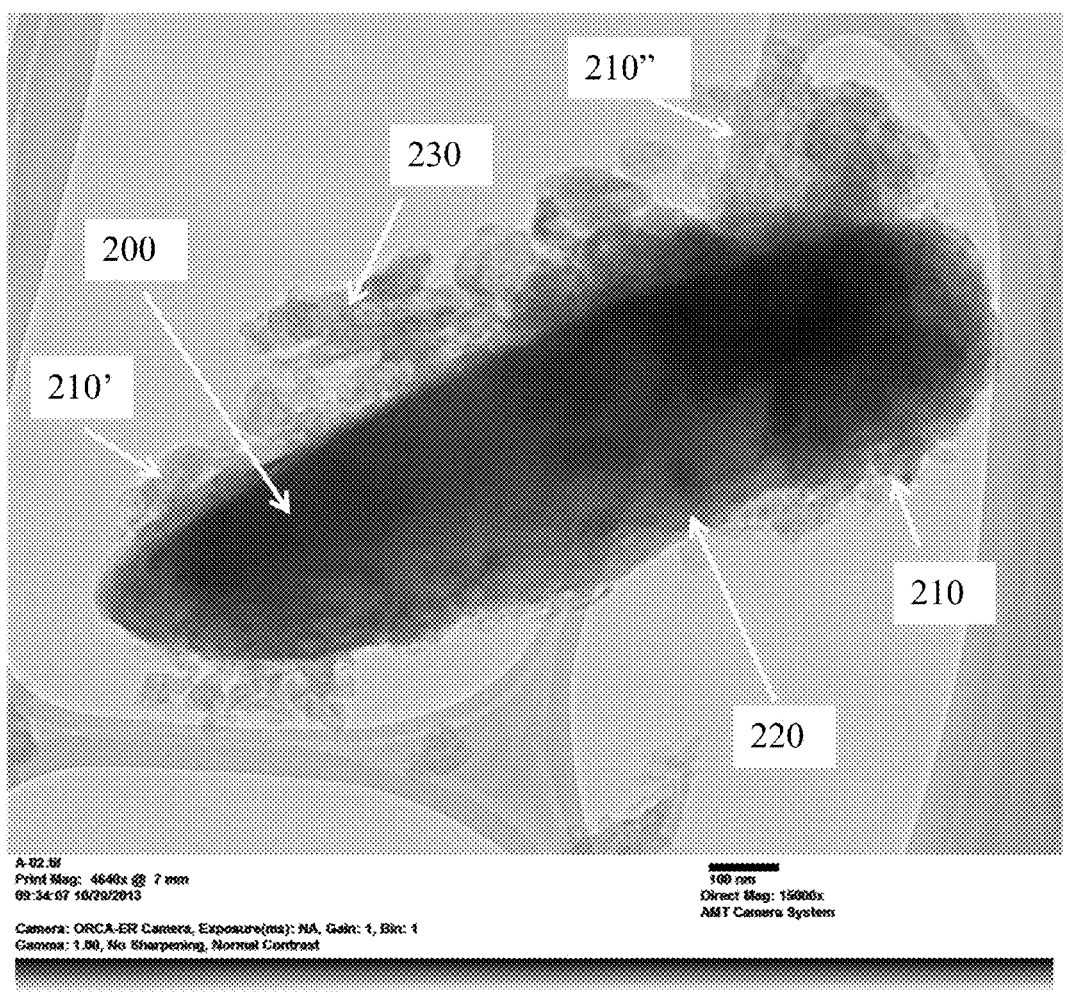
FIG. 2 is a transmission electron microscopy (TEM) image of a silicon particle coated with a large number of graphene nanoplatelets according to one or more embodiments (scale bar is 100 nm).

FIG. 2 is a TEM image of a silicon particle 200 coated with a large number of graphene nanoplatelets 210 (scale bar is 100 nm) according to one or more embodiments. The TEM images make it readily possible to establish the size of graphene platelets involved in multilayer coating of Si. It is apparent from this image that the silicon particle is many times larger than the nanoplatelets. Nanographene particles range from about $1/10^{th}$ the size of the silicon particle (210') to about ¼ the size of the silicon particle (210"). In addition, the nanocomposite contains an inner layer 220 that is in close direct contact with the silicon particle and an outer layer 230 of more loosely associated graphene nanoparticles.

Figure 3:
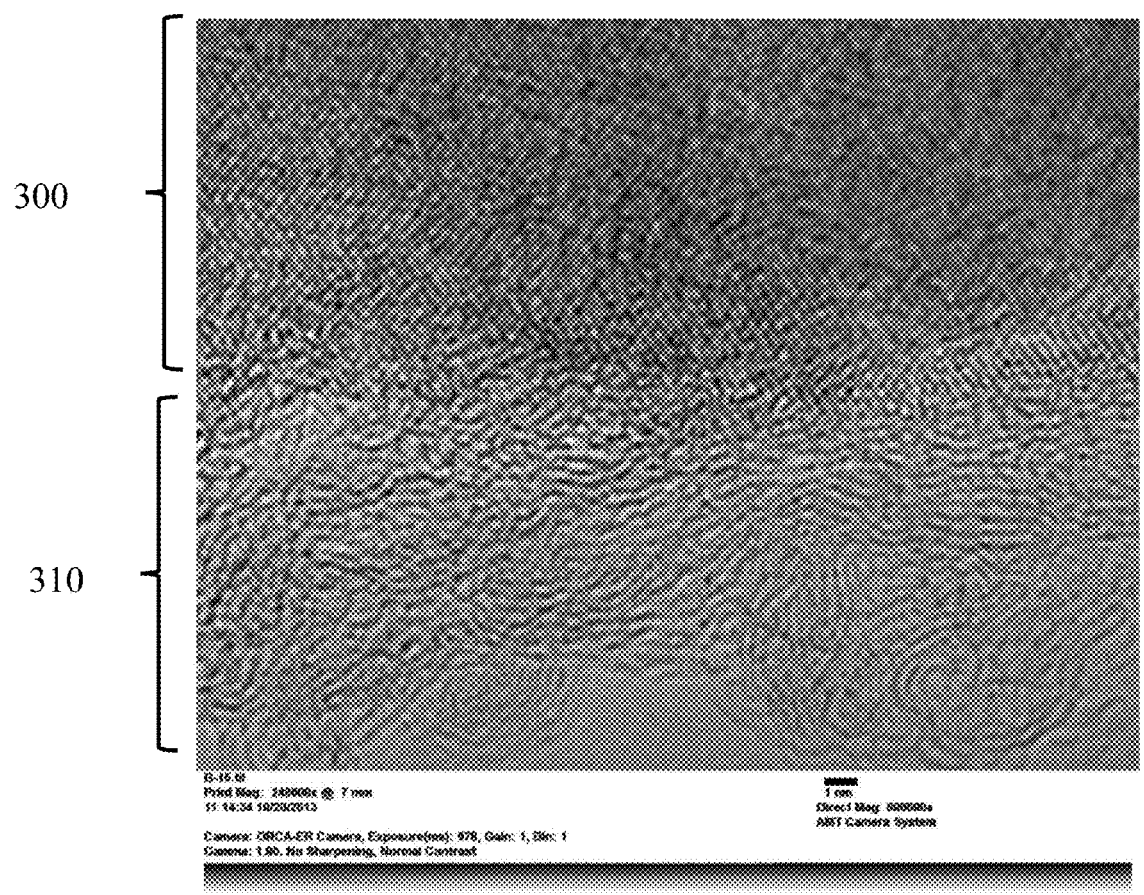
FIG. 3 is a high resolution TEM image of the interface between a silicon particle and a graphene nanoplatelet layer (scale bar is 1 nm) according to one or more embodiments.

FIG. 3 is a high resolution TEM image of the interface between a silicon particle and a graphene nanoplatelet layer (scale bar is 1 nm) according to one or more embodiments. The upper region 300 is the lattice of the silicon particle. The lower region 310 is the graphene nanoplatelet coating on the silicon particle. The platelets in this image have graphene layers that are about 10-12 nm thick; the region closest to the silicon surface shows a strong connection to the silicon particle. The graphene layers are stacked over one another in a random manner to provide a tangled or crimped or undulating arrangement of layers.

Figure 4:
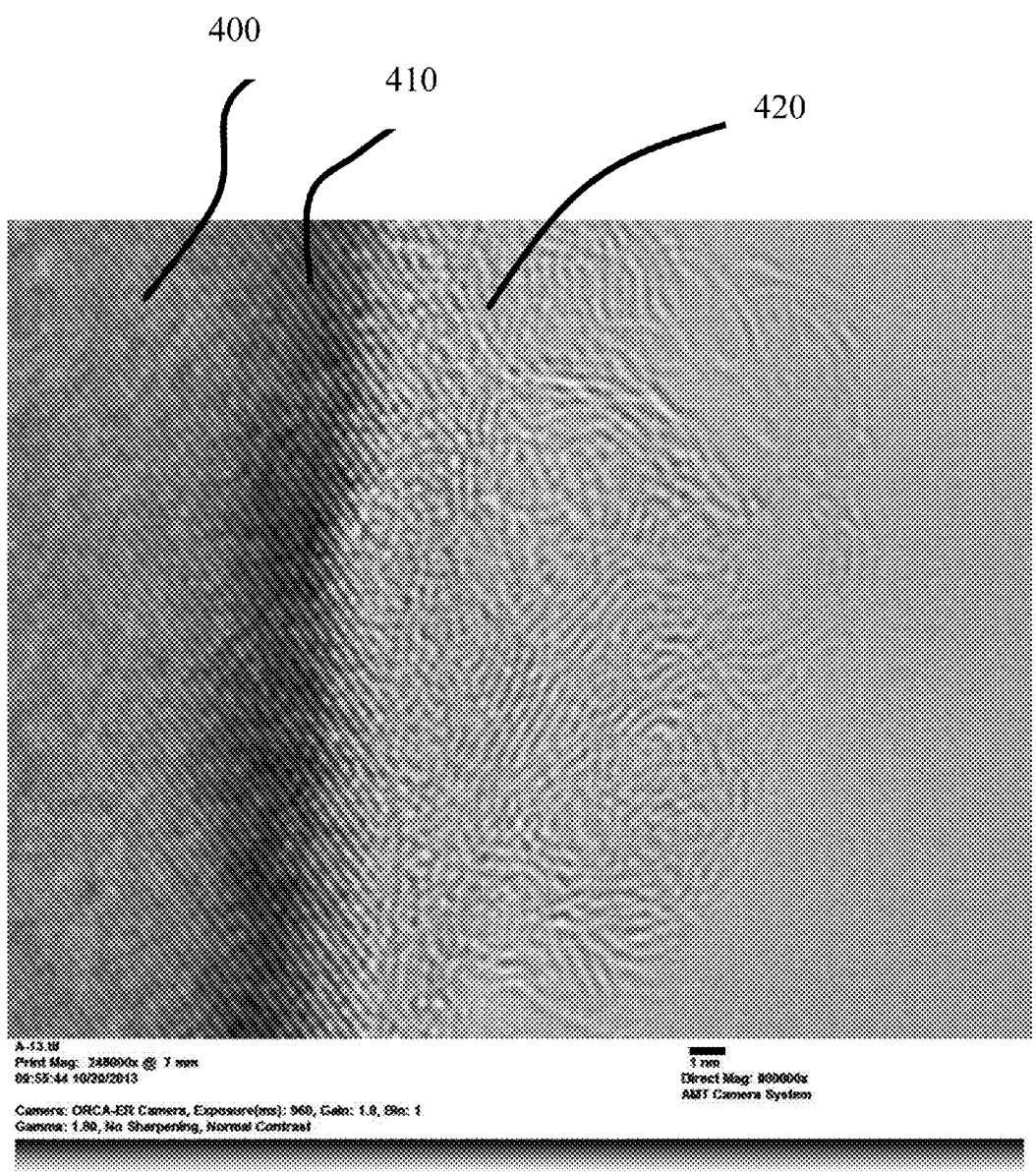
FIG. 4 is a high resolution TEM image of the interface between a silicon particle 400 and a graphene nanoplatelet layer (scale bar is 1 nm) according to one or more embodiments.

FIG. 4 is a high resolution TEM image of the interface between a silicon particle 400 and a graphene nanoplatelet layer (scale bar is 1 nm) according to one or more embodiments. The graphene nanoplatelet includes an inner region 410 that is intimately interacting with the silicon particle 400. The region appears to provide an intermixing or interdiffusion of the silicon and graphene regions, as it transitions from an order structure (closest to silicon) to a disordered structure (further from silicon). The graphene nanoplatelet layer also includes an outer region 420 that includes a looser arrangement of graphene layers. The layers are not strictly planar to the silicon surface and take on a range of orientations, as the graphene layers form a tangled, undulating coating.

Figure 5A:
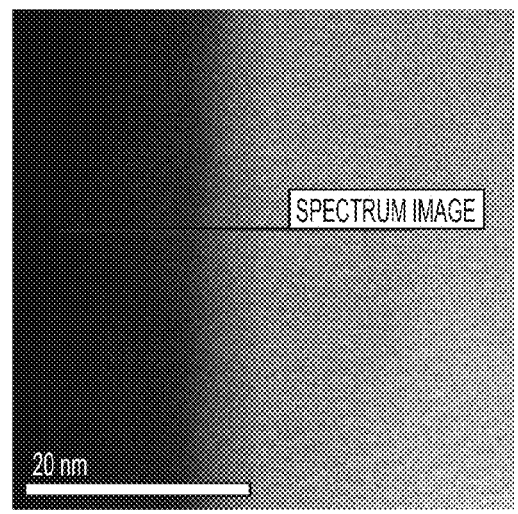
FIGS. 5A-5C investigate the composition of the interface region between the silicon particle and the graphene nanoplatelet coating according to one or more embodiments.
Figure 5B:
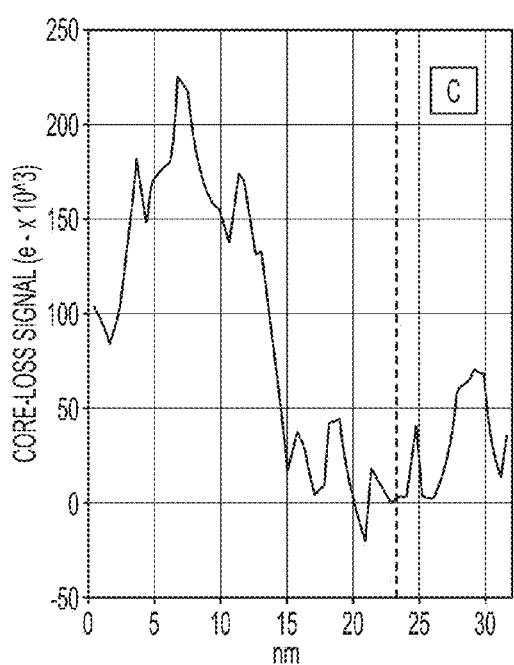
Figure 5C:
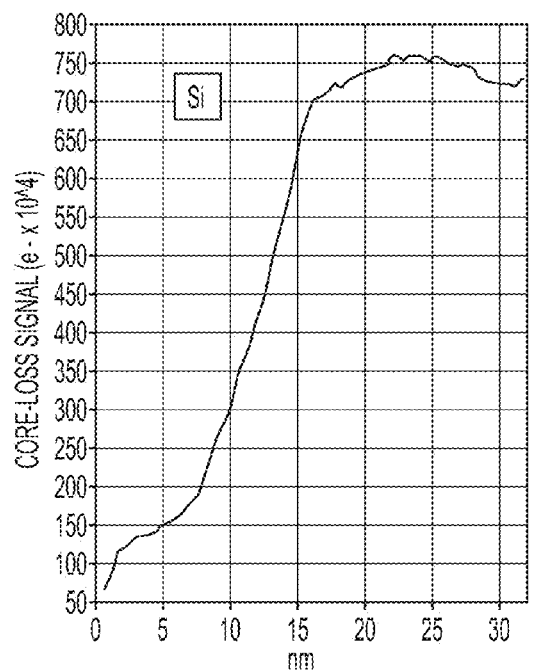

FIGS. 5A-5C investigate the composition of the interface region between the silicon particle and the graphene nanoplatelet coating according to one or more embodiments. FIG. 5A is a photomicrograph image of the surface being scanned by electron energy loss spectroscopy (EELS). in which the line indicates the area investigated. FIGS. 5B and 5C are intensity scans that show the intensity change of Si and C along the line of FIG. 5A. There is a layer with containing both Si and C.

Figure 6A:
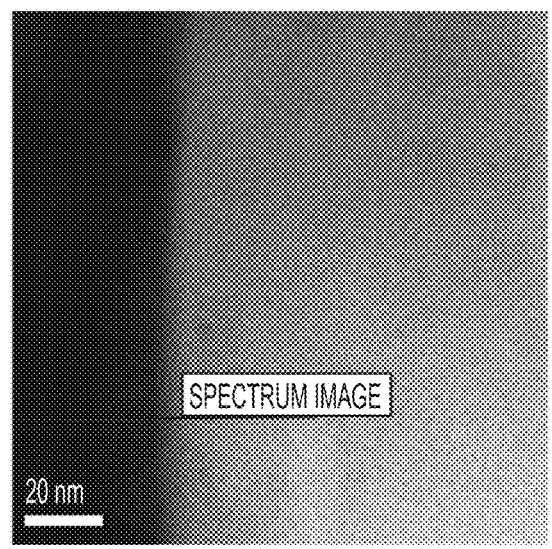
FIGS. 6A-6C investigate the composition of the interface region between the silicon particle and the graphene nanoplatelet coating according to one or more embodiments.
Figure 6B:
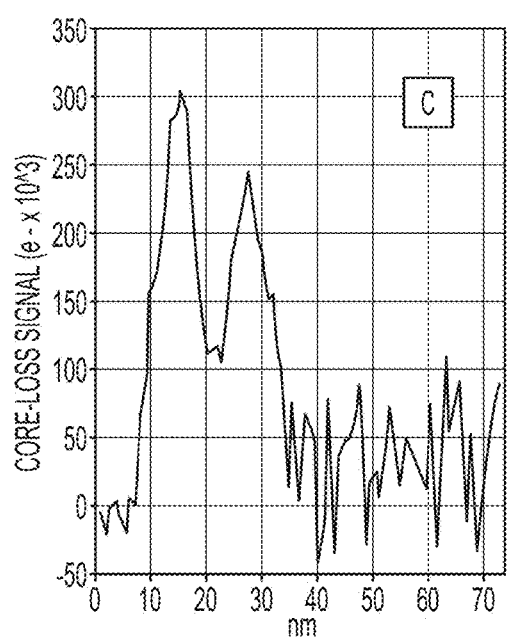
Figure 6C:
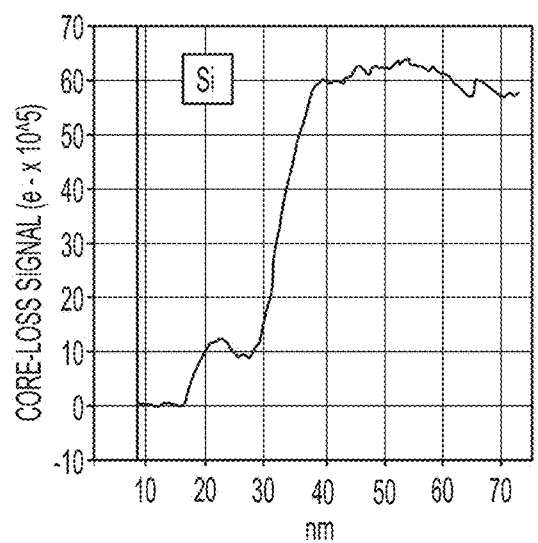

FIGS. 6A-6C investigate the composition of a different interface region between the silicon particle and the graphene nanoplatelet coating. FIG. 6A is a photomicrograph image of the surface being scanned by electron energy loss spectroscopy (EELS) in which the line indicates the area investigated. FIGS. 6B and 6C are intensity scans that show the intensity change of Si and C along the line of FIG. 6A. There is a layer with containing both Si and C.

Figure 7:
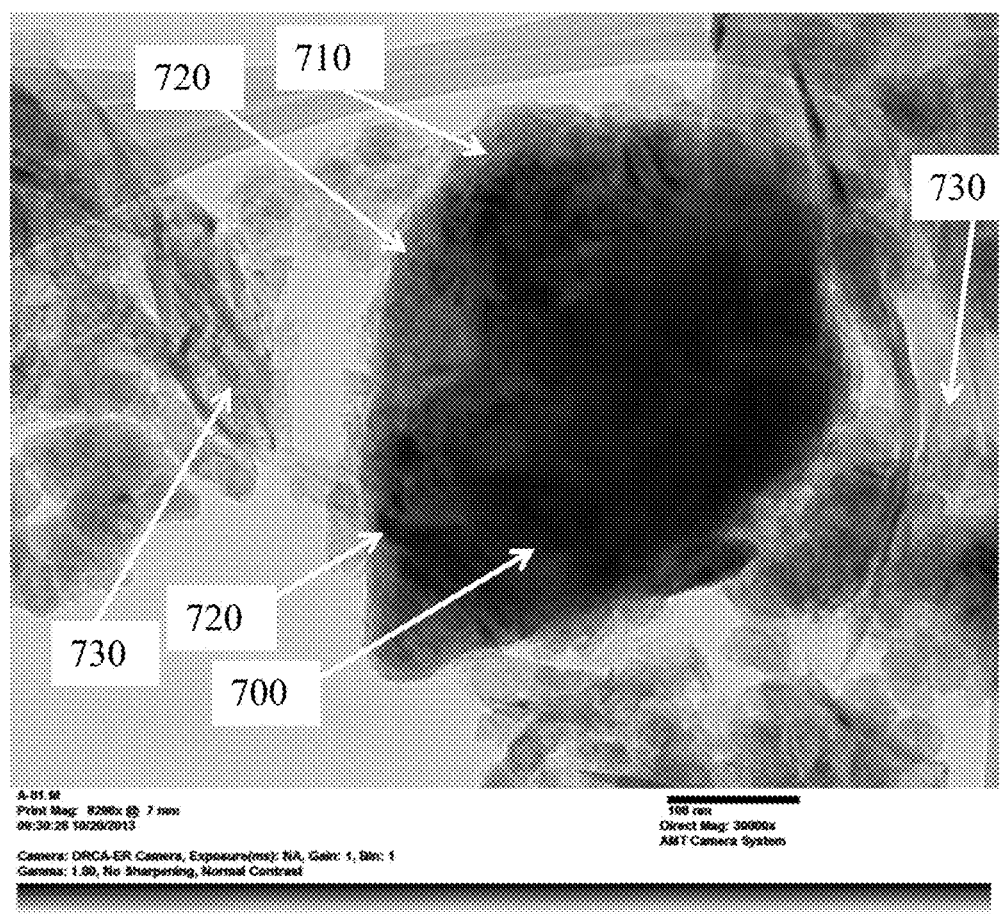
FIG. 7 is a TEM photomicrograph of graphitic nanocomposite according to one or more embodiments (scale bar is 100 nm).

FIG. 7 is a TEM photomicrograph of graphitic nanocomposite according to one or more embodiments (scale bar is 100 nm). The silicon particle 700 has a graphene nanoplatelet layer 710 that is composes of smaller nanographene platelets 720. Note that large graphene sheets 730 are also identifiable in the image; however, they are spaced apart from and do not constitute part of the silicon/graphene nanocomposite.

Figure 8:
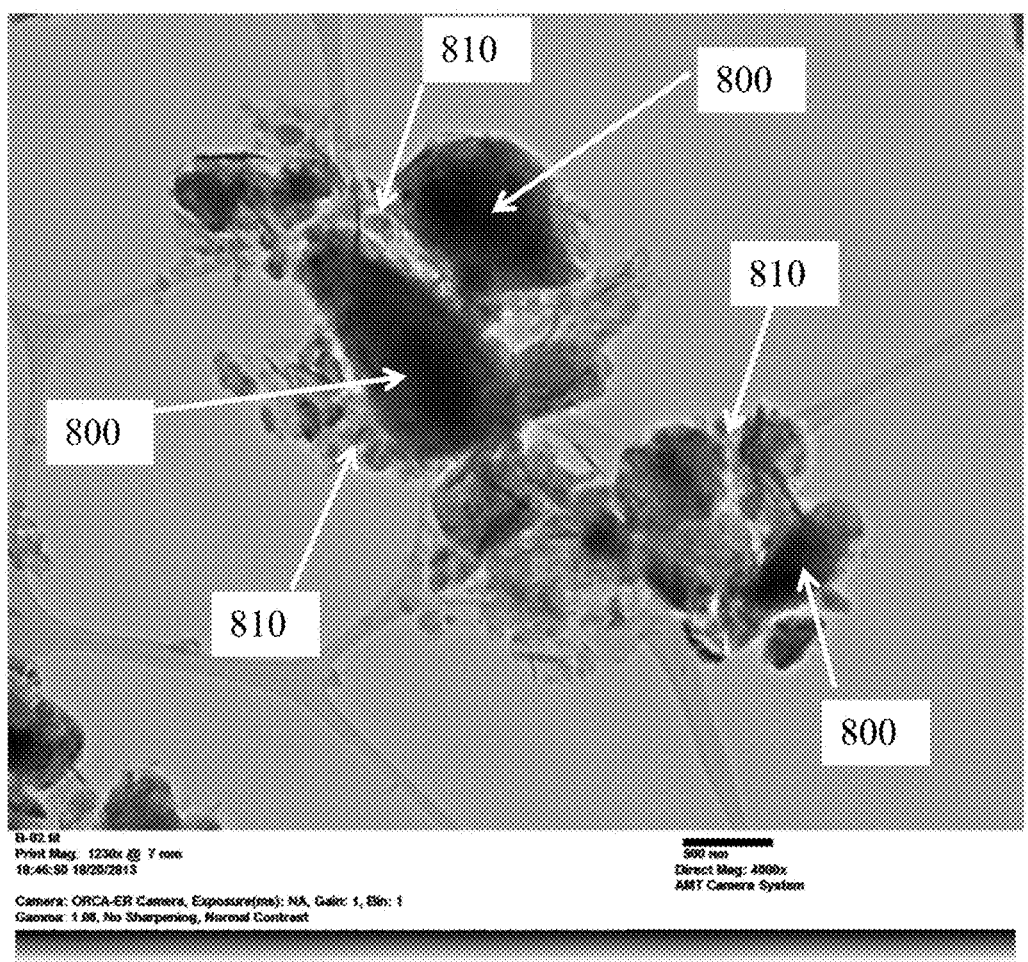
FIG. 8 is a transmission electron microscopy (TEM) image of a cluster of silicon particles coated with a large number of graphene nanoplatelets according to one or more embodiments (scale bar is 500 nm).

FIG. 8 is a slightly lower resolution TEM image of a cluster or agglomeration of a number of silicon particles 800 coated with a large number of graphene nanoplatelets 810 (scale bar is 500 nm). Even in this lower resolution image, the graphene nanoplatelet coating is clearly visible. It is apparent from this image that the silicon particle is many times larger than the nanoplatelets.

In another aspect, a method of making a graphitic nanocomposite suitable for use as a battery material is described. As noted above, composites using graphene sheets has been reported; however the resulting composites provide graphene sheets that span several or many active particles and do not give rise to the supporting and embracing network of nanographitic layer of the composites described herein. While it is possible to reduce the size of the large graphene sheets or platelets prior to compositing with the electroactive particles, the resultant nanoscale powder is difficult to handle and the dry powder mixing or even slurry mixing can be challenging due to agglomeration, material transport of low bulk, fluffy materials, increased risks of inhalation exposure, and the like. To avoid these prior art problems and to allow for the intimate contact between the electroactive particle and the graphene nanoplatelets, improved methods of making a graphitic nanocomposite include simultaneous size reduction and compositing of the component elements of the graphitic nanocomposite.

In one or more embodiments, a precursor graphite material and a precursor to the electroactive particles are introduced into an exfoliation apparatus that simultaneously (1) exfoliates the large graphite sheets into thinner graphenic layers, (2) reduces the graphite sheets to nanoscale dimensions, and (3) reduces the particle size of the electroactive particle precursor. Additives also can be included to the starting materials used to prepare the nanocomposite. Acetylene black, carbon black, or ultra-fine graphite particles may be used as an additional conductor additive. If the added particles are larger than or of a size commensurate with the graphitic nanoplatelets generated during this process, they are coated with the graphitic nanoplatelets. If the added particles are smaller than the silicon particles, they can become incorporated into the graphene nanoplatelet layer.

Figure 9:
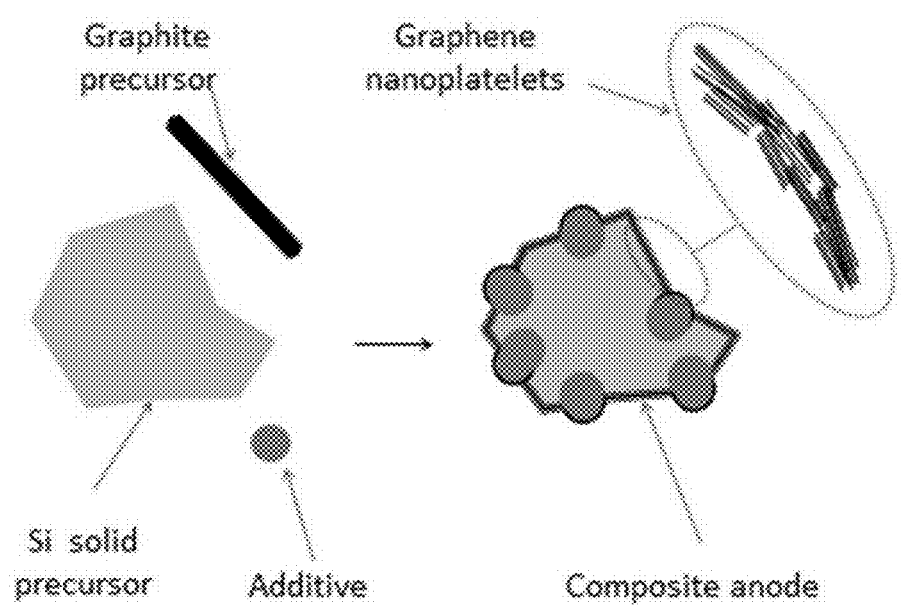
FIG. 9 is a high resolution transmission electron microscopy (TEM) photograph of a nanocomposite according to one or more embodiments that shows the graphitic nanoplatelet coating the silicon particle surface according to one or more embodiments (scale bar is 1 nm).

This process is illustrated in FIG. 9. The precursor materials include an electroactive particle such as silicon, graphite and optional additives. The graphite can be conventional or natural graphite. For example, graphite having a lateral dimension on the order of 5 µm to 800 µm can be used. The precursor electroactive particle can have a size of 100 microns or less. In some embodiments, particle sizes of 10 microns or less, or particle sizes of 5 microns or less can be used. In some embodiments, particle sizes of 3-10 microns, or particle sizes of 3-5 microns can be used.

The precursor materials are introduced into an exfoliation apparatus, wherein the graphite is exfoliated and size-reduced, and the electroactive particle is size-reduced. A suitable exfoliation apparatus is a media ball mill that imparts forces in three planes and in multiple orbital planes, simultaneously. The apparatus acts on the media to translate it in all planes simultaneously. By doing so, the energy of the apparatus is converted into the stress state required to cause the exfoliation of the particulate material. Other methods of milling, grinding, or size reduction of particulates can be used to the extent that they effect exfoliation instead of pulverization. A suitable apparatus and method of milling is described in co-pending U.S. application Ser. No. 13/435,260, filed Mar. 30, 2012, which is incorporated in its entirety by reference.

In one embodiment, the starting electroactive particle has a particle size of 3~10 µm and the particles are reduced to particles with a longest lateral dimension is about 500 nm to about 3 µm, or about 1-2 µm, with a tail into the smaller particle size. Because the electroactive particle size is reduced in a process that simultaneously forms the graphene nanoplatelets and assembles the graphene nanoplatelet layers around the electroactive particle, the particle size distribution of the electroactive particle can be large. In one or more embodiments, the size distribution of the electroactive particles can range from 10 nm to 3 µm. In one or more embodiments, the size distribution of the silicon particles can range from 10 nm to 3 µm in an nSiG nanocomposite.

In one or more embodiments, 300~500 µm natural graphite flake is used and nanographene having a thickness of between 0.34 nm and 50 nm, or a thickness of between 0.34 nm and 5 nm, and a lateral dimension of less than 900 nm is obtained. Graphene produced by media ball milling has very small particle size with a relatively high surface area. It is well-suited to make nano-composites or coatings by coating or admixing other particles. In addition, the high energy of the exfoliation process induces reaction between the graphene nanoparticles and the electroactive particle. While not limited to any specific mechanism or theory of operation, the graphene forms robust interactions such as covalent bonds or interdiffusion reactions with the electroactive material. In one or more embodiments, the interface may include intermetallic compounds formed by the reaction of the graphene with the electroactive particle. Metals or metal oxides can be coated or formed into composites with the high surface area, relatively low aspect ratio graphene. The expanded section in FIG. 9 shows the nanoscale graphene platelets that coat the electroactive particle. Additives introduced during the milling operation, will also be incorporated into the coating, or they can occupy interstitial spaces between particles. Further details on a method of dry milling powders while effecting exfoliation of graphite is described in co-pending U.S. application Ser. No. 13/474,860, filed May 18, 2012, which is incorporated in its entirety by reference.

The method thereby provides significant improvements in both performance and properties of the final product and in the methods used to make it. The method produces a nanoscale composite starting with microscale precursor materials. Thus, the materials handling is easier and there are lower health risks associated with handling of the precursors materials and final powder products.

In one aspect, a method is provided for preparation of a nanocomposite including introducing an electroactive material powder into a high energy dry mill, wherein the powder particles are of a micron-scale dimension; introducing a graphite powder into the high energy dry mill, wherein the powder particles are of a micron-scale dimension; and milling the electroactive particle powder and the graphite particle powder, to exfoliate the graphite and reduce the particle size of the electroactive particle to between 10 nm and 3 µm and reduce the particle size of the graphite particle to less than 900 nm, wherein the exfoliated size-reduced graphite coats the surface of the sized-reduced electroactive particle, wherein the final composite includes agglomerates of the graphene coated particles that are greater than 1 µm, or greater than 2 µm, or greater than 3 µm, while also possessing components that are on the nanoscale. Thus, the material performance benefits of the nanocomposite are realized while providing the ease of materials handling of micron-scale powders.

Figure 10:
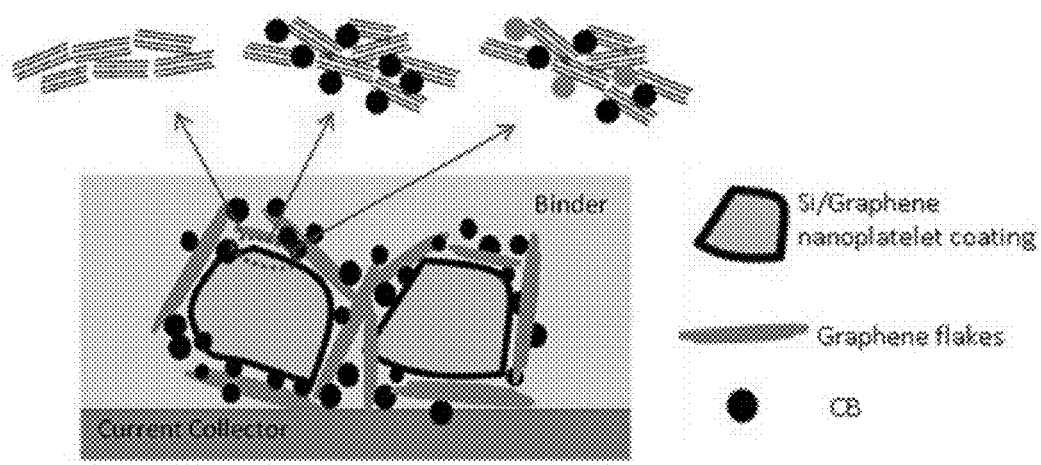
FIG. 10 is a schematic illustration of a process for preparing a nanographitic composite according to one or more embodiments.
Figure 11:
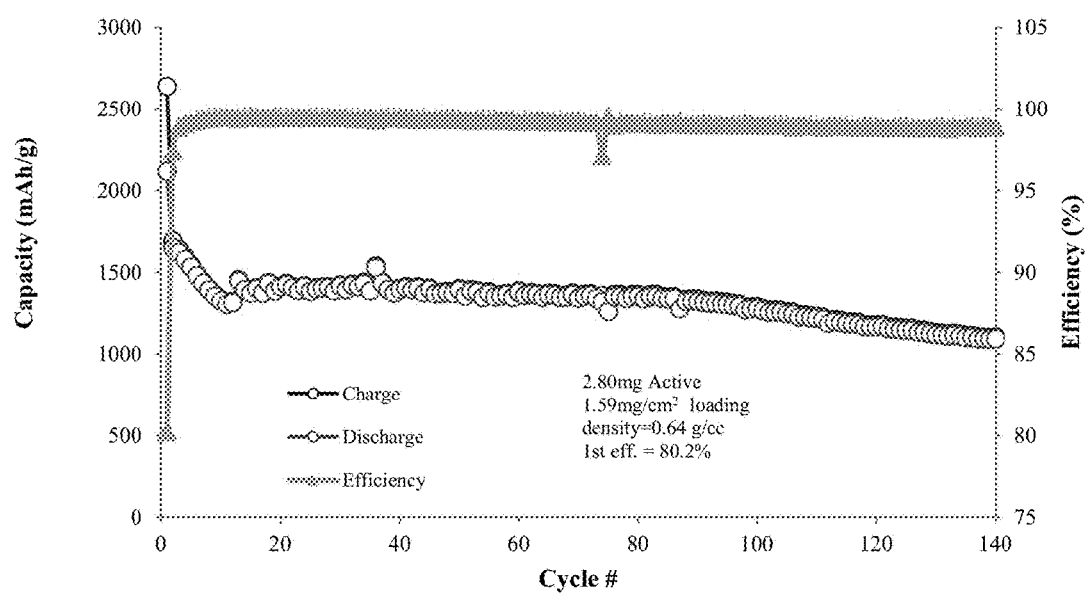
FIG. 11 is a schematic illustration of an anode incorporating the nanographitic composite according to one or more embodiments.
Figure 12:
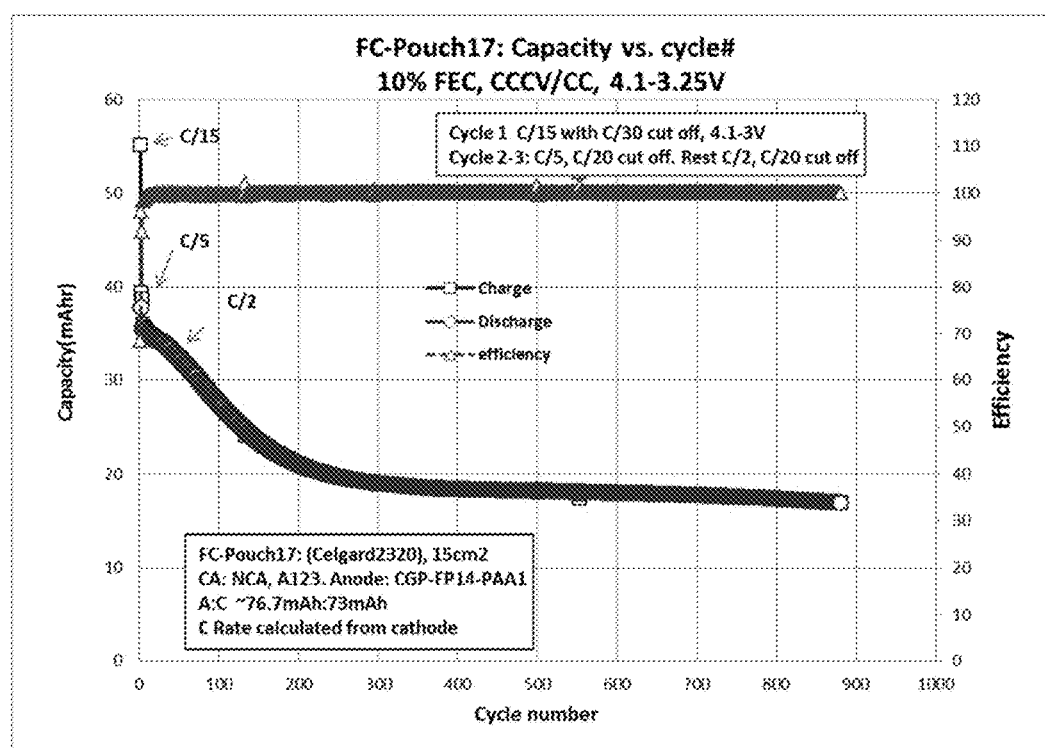
FIG. 12 is a plot of capacity vs. cycle number, demonstrating the capacity and cycle performance of Si/graphene anode; tested in coin cell vs. Li counter electrode with 1M LiPF$_6$/EC:DMC (1:1) electrolyte with 10% FEC as additive.
Figure 13:
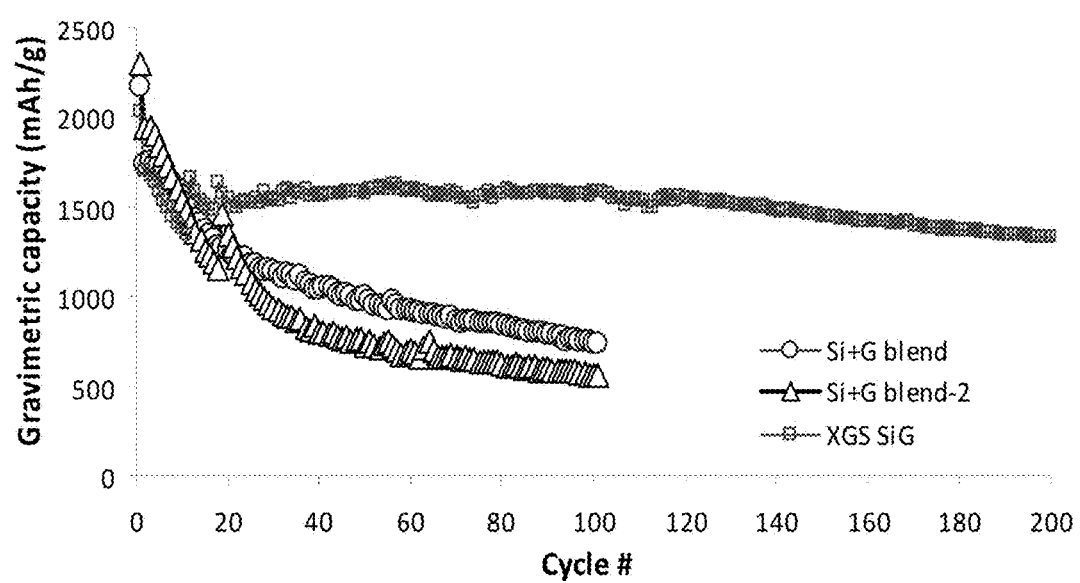
FIG. 13 is a plot of capacity vs. cycle number, demonstrating the cycle performance of a full cell consisting of NCA cathode, SiCG-B/graphite anode, and 1M LiPF$_6$ in EC/DMC+10% FEC electrolyte.
Figure 14A:
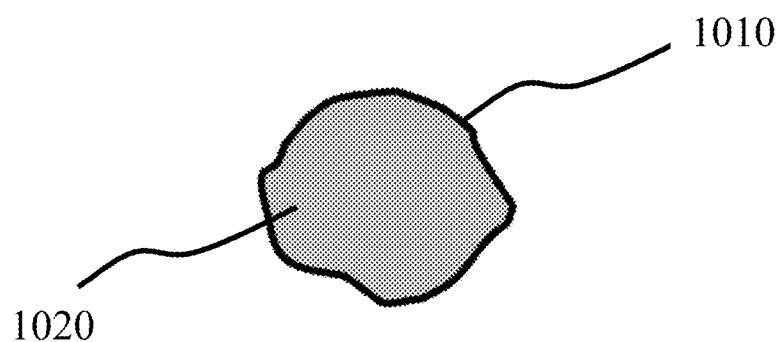
FIG. 14A and FIG. 14B are illustrations of prior art approaches to combining silicon with carbon.
Figure 14B:
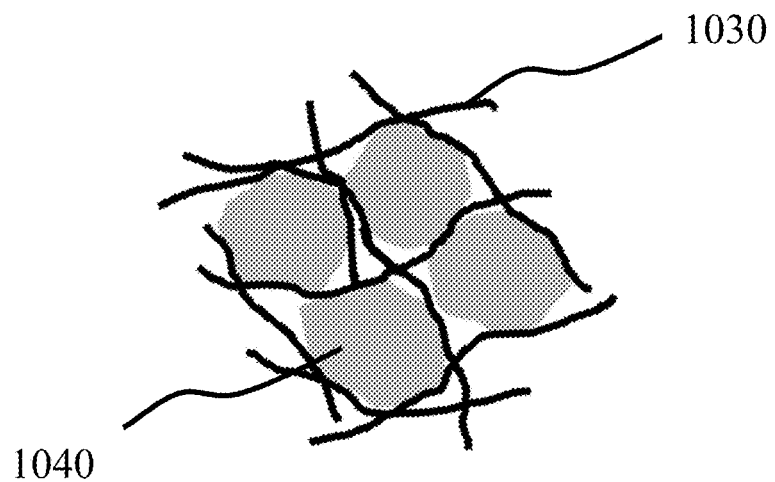

In another aspect, an anode prepared using the nanographitic composite is provided. Anode can be prepared by assembling the nanocomposite particles on a current collector and securing the particles, typically by using a binder, as illustrated in FIG. 10. The expanded view in FIG. 3 illustrates several exemplary embodiments of the nanocomposite that can be used in forming an anode. The graphitic nanoplatelet coating can consist substantially of graphitic nanoplatelets (left), or it can include carbon black (CB) as a conductive additive (center), or it can include both carbon black and/or acetylene black (right), by way of example. Suitable binders include those typically used in lithium ion batteries. Exemplary binders include polyacrylic acid (PAA), polyvinylidene fluoride (PVDF), carbomethoxy cellulose (CMC), PAA/CMC, CMC/SBR (styrene-butadiene rubber (SBR)), polyamide-imide (PAI), Sodium alginate, and lithium polyacrylate (LiPAA) could be used in a certain electrode formulation.

In addition to building graphitic nanoplatelets into the active composite anode, graphene flakes can also be included as a conductive additive in the electrode coating, as illustrated in FIG. 10. These graphene nanoplatelets are much larger than the nanoscale graphitic nanoplatelets used to from the graphitic nanoplatelet coating in the nanocomposite and can range from 5 to 50 µm, and more typically between 15 and 25 µm. The flexible and flake morphology of the graphene nanoplatelets is expected to provide better contact with the active particles and helps maintain the mechanical integrity of the electrode coating during the cycling. Moreover, if used together with carbon blacks and carbon nanotubes, graphene nanoplatelets additive may help create a conductive network with zero, one, and two-dimensional contacts throughout the electrode.

A further embodiment is a lithium ion battery incorporating such an anode, a cathode, a separator disposed between the anode and the cathode, and electrolyte in physical contact with both the anode and the cathode.

A lithium ion battery may include an anode featuring the nanographitic composite containing anode active particles. They can be readily mixed with graphene platelets or flakes to form graphene-enhanced particulates. Acetylene black, carbon black, or ultra-fine graphite particles may be used as an additional conductor additive. For the preparation of a cathode, the binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 90 to 98% by weight for the particulates, and 2 to 10% by weight for the binder. There is no particularly significant restriction on the type of current collector, provided the material is a good electrical conductor and relatively corrosion resistant.

Although not required, a cathode can also include nanographitic composite containing cathode active particles. The cathode nanocomposite is made using the methods and procedures set up above for the anode. There is no particular restriction on the type and nature of the cathode active material, which can be selected for practicing the present invention. The cathode active substances can be prepared in the form of a fine powder, nano-wire, nano-rod, nano-fiber, or nano-tube. They can be readily mixed with NGPs to form graphene-enhanced particulates. Acetylene black, carbon black, or ultra-fine graphite particles may be used as an additional conductor additive. For the preparation of a cathode, the binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 90 to 98% by weight for the particulates, and 2 to 10% by weight for the binder. There is no particularly significant restriction on the type of current collector, provided the material is a good electrical conductor and relatively corrosion resistant.

The separator may be selected from a synthetic resin nonwoven fabric, porous polyethylene film, porous polypropylene film, or porous PTFE film.

A wide range of electrolytes can be used for practicing the instant invention. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. Examples of preferred mixed solvent are a composition comprising EC and EMC; comprising EC, PC and EMC; comprising EC, EMC and DEC; comprising EC, EMC and DMC; and comprising EC, EMC, PC and DEC; with the volume ratio of EMC being controlled within the range of 30 to 80%. The electrolytic salts to be incorporated into a non-aqueous electrolyte may be selected from a lithium salt such as lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$) and bis-trifluoromethyl sulfonylimide lithium [LiN(CF$_3$SO$_2$)$_2$].

The proposed Si/graphene composite anode is a potentially disruptive and enabling technology. Paired with a high energy cathode, it will help increase energy density of lithium ion battery from the present level of <200 Wh/kg to the 400 Wh/kg that is needed for electrified transportation in US and the world. High energy-density lithium ion batteries are also needed for other industries such as consumer electronics, utility, power electronics, and renewable energy.

FIG. 4 shows the typical capacity, first cycle reversibility, and cycling stability of Si/graphene anode tested in coin cells vs. Li counter-electrode in 1M LiPF$_6$ and EC:DMC (1:1) electrolyte with 10% FEC as an additive. The material shows a reversible capacity over 1000 mAh/g, a first cycle reversibility of >80%, and a stable cycling over more than 140 cycles, which is typically the meaningful testing range of a lab coin cell. FIG. 5 shows the cycling performance of Si/graphene in full cells paired with lithium nickel cobalt aluminum oxide (NCA) cathode obtained from a battery developer. The anode had a loading of 5.1 mAh/cm$^2$ and was cycled at a capacity around 600 mAh/g. While it showed a substantial capacity drop in the first 200 cycles, it reached 1000 cycles with 50% of capacity retention. Further optimization of parameters such as cell balance, loading, formation scheme, and charge/discharge scheme will result in improved performance.

The performance of cells prepared using the graphitic nanocomposites according to one or more embodiments were compared to cells using a mixture of silicon and micron size graphene nanoplatelet (GNP).

Electrodes were made of 70% SiG nanocomposite as an active material with 20% of polyacrylic acid (MW=450K) binder, and 10% of micron size graphene nanoplatelet (GNP) as a conductive agent. An SiG nanocomposite containing 67 wt % Si was fabricated by milling with natural graphite for 3 hours. Its tap density was 0.93 and BET surface area was 163 m$^2$/g. The electrode composition was prepared by first dissolving polyacrylic acid in propylene glycol monomethyl ether (PGME), followed by GNP dispersion via simple magnetic stirring at 400 rpm for at least 2 hours. Then SiG powder was added and stirred at 500 rpm for at least 3 hours. The slurry was coated on Cu foil by an automatic doctor blade casting. The coated electrode was dried at room temperature, followed by final drying at 120° C. overnight. An active mass loading of Si was about 1.2~1.5 mg/cm$^2$. Capacity of the electrode was adjusted to about 2414 mAh/g.

For the Si/G blended anodes, Si mass loading on electrode was kept the same as SiG anode. However, the silicon powder was simply blended by adding Si and with the micron size graphene nanoplatelets (GNP) in order after dissolving a binder in a solvent. In all cases, SiG (or Si+G):PAA Binder:Conductive agent=70:20:10. Even when nano Si is used, similar result obtained.

Half-cell tests were conducted using 2025 coin cell in an argon-filled glove box with Li metal discs as a counter electrode. A porous glass paper used as a separator was soaked in 1M LiPF$_6$-EC/DMC electrolyte with 10 wt % fluoroethylene carbonate. Electrochemical experiments were performed at 26° C. by galvanostatic charge/discharge cycling of the cells in the range of 0.01 to 1 V vs. Li+/Li, monitored by Arbin battery tester. The cell prepared using the SiG nanocomposite according to one or more embodiments of the invention maintained a capacity of approx. 1500 mAh/g over 200 cycles. In comparison, the capacity of the Si+G blends faded quickly to approx. 500-800 mAh/g after just 100 cycles.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A nanographitic composite comprising:
   a plurality of composite particles, each composite particle comprising:
   an electroactive particle of one of: an alloy or intermetallic compounds of Si, Ge, Sn, Pb, Sb, Bi, Zn, Al, or Cd; an oxide, carbide, nitride, sulfide, phosphide, selenide, telluride, antimonide, or their mixtures of Si, Ge, Sn, Pb, Sb, Bi, Zn, Al, Fe, or Cd; or one or more metals of silicon, tin, iron, magnesium, aluminum, lead, gold, silver, titanium, platinum, palladium, ruthenium, copper, nickel, rhodium and nickel and combinations thereof;
   a coating layer comprising an inner film comprising graphene that is bound by covalent or interdiffusion bonding to the electroactive particle and an outer layer of graphene nanoplatelets disposed over the inner film comprising the graphene
   wherein the outer layer of the graphene nanoplatelets has a longest lateral dimension that is less than a longest lateral dimension of the electroactive particle, and
   wherein the outer layer of the graphene nanoplatelets is configured to accommodate a volume change in the electroactive particle and the graphene nanoplatelets are not strictly planar to a surface of the electroactive particle and take on a range of orientations.

2. The nanographitic composite of claim 1, wherein the inner film additionally comprises a mixture of carbon and silicon.

3. The nanographitic composite of claim 1, wherein the inner film has a thickness in the range of 1-25 nm.

4. The nanographitic composite of claim 1, wherein the inner film is integral with the electroactive particle.

5. The nanographitic composite of claim 1, wherein the inner film is crystalline.

6. The nanographitic composite of claim 1, wherein the inner film is disordered or amorphous.

7. The nanographitic composite of claim 1, wherein the electroactive particle comprises silicon and the inner film additionally comprises a SiC intermetallic.

8. The nanographitic composite of claim 1, wherein the inner film is covalently bonded to the electroactive particle.

9. The nanographitic composite of claim 8 wherein the covalent bond is a pi-bond or a partial pi-bond.

10. The nanographitic composite of claim 1 wherein the electroactive particle comprises silicon and the silicon and an additional carbon of the inner film form a compositional gradient across its thickness.

11. The nanographitic composite of claim 1, wherein the plurality of composite particles form agglomerates.

12. The nanographitic composite of claim 1, wherein the graphene nanoplatelets have a thickness of 0.34 nm to 50 nm and lateral dimensions of less than 900 nm.

13. The nanographitic composite of claim 1, wherein the outer layer of graphene nanoplatelets comprises multiple layers of graphene nanoplatelets.

14. The nanographitic composite of claim 1, wherein the electroactive particle is the one or more metals.

15. The nanographitic composite of claim 1, wherein electroactive particle comprises silicon.

16. The nanographitic composite of claim 15, wherein the silicon is present in a range from 10 wt % to 90 wt % of the composite particle.

17. The nanographitic composite of claim 16, wherein the composite particle further comprises a conductive carbon additive.

18. The nanographitic composite of claim 17, wherein the conductive carbon additive is selected from the group consisting of carbon black, acetylene black, carbon nanotube, carbon fiber, carbon nanohorn, carbon nanocoil and combinations thereof.

19. The nanographitic composite of claim 1, wherein the composite particle has a tap density of greater than 0.50 g/cm$^3$.

20. The nanographitic composite of claim 1, wherein the composite particle has a tap density of greater than 0.8 g/cm$^3$.

21. The nanographitic composite of claim 15, wherein the silicon is present in a range from 40 wt % to 70 wt % of the composite particle.

22. The nanographitic composite of claim 1, wherein the outer layer of graphene nanoplatelets are associated with the inner film through van der Waals attraction.

23. The nanographitic composite of claim 1, wherein graphene nanoplatelets in the outer layer comprises graphene nanoplatelets having a longest lateral dimension that is less than 50% of a longest lateral dimension the electroactive particle.

24. The nanographitic composite of claim 1, wherein graphene nanoplatelets in the outer layer comprises graphene nanoplatelets having a longest lateral dimension that is less than 25% of a longest lateral dimension the electroactive particle.

25. The nanographitic composite of claim 1, wherein the graphene nanoplatelets of the outer layer comprises tangled graphene.

26. The nanographitic composite of claim 1, wherein the graphene nanoplatelets of the outer layer comprises stretched graphene.

27. The nanographitic composite of claim 1, wherein the graphene nanoplatelets have a longest lateral dimension of less than 500 nm.

28. The nanographitic composite of claim 1, wherein the graphene nanoplatelets have a longest lateral dimension in the range of 10 nm-700 nm.

29. The nanographitic composite of claim 1, wherein the graphene nanoplatelets have a longest lateral dimension in the range of 30 nm to 200 nm.

30. An electrode for use as an anode in a lithium ion battery, said electrode comprising:
   (a) the nanographitic composite according to claim 1; and
   (b) a binder.

31. The electrode of claim 30, further comprising a conductive additive.

32. The electrode of claim 31, wherein the conductive additive comprises a graphene.

33. The electrode of claim 31, wherein the conductive additive is 2 to 20 wt % of the total electrode weight.

34. The electrode of claim 30, wherein the binder is 3 to 20 wt % of the total electrode weight.

35. A lithium ion battery comprising:
   an anode according to claim 30;
   a cathode;
   a separator spacing apart the anode and the cathode; and
   an electrolyte in contact with the anode and the cathode.

* * * * *